US011182395B2

(12) United States Patent
Mirylenka et al.

(10) Patent No.: US 11,182,395 B2
(45) Date of Patent: Nov. 23, 2021

(54) SIMILARITY MATCHING SYSTEMS AND METHODS FOR RECORD LINKAGE

(71) Applicant: International Business Machines Corporation, Armonk, NY (US)

(72) Inventors: Katsiaryna Mirylenka, Zurich (CH); Paolo Scotton, Rueschlikon (CH); Christoph Adrian Miksovic Czasch, Aeugst am Albis (CH); Andreas Schade, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 15/980,066

(22) Filed: May 15, 2018

(65) Prior Publication Data

US 2019/0354596 A1 Nov. 21, 2019

(51) Int. Cl.
*G06F 17/18* (2006.01)
*G06F 16/2457* (2019.01)
*G06N 20/00* (2019.01)
*G06F 16/2455* (2019.01)

(52) U.S. Cl.
CPC .. *G06F 16/24578* (2019.01); *G06F 16/24553* (2019.01); *G06F 17/18* (2013.01); *G06N 20/00* (2019.01)

(58) Field of Classification Search
CPC ......... G06F 16/24578; G06F 16/24553; G06F 17/18
USPC ........................................................ 707/731
See application file for complete search history.

(56) References Cited

U.S. PATENT DOCUMENTS

| | | | |
|---|---|---|---|
| 7,542,973 B2 | 6/2009 | Segal | |
| 7,627,550 B1 * | 12/2009 | Adams | ............. G06F 16/24556 |
| 7,814,107 B1 * | 10/2010 | Thirumalai | ............ G06F 16/93 |
| | | | 707/749 |
| 8,095,386 B2 | 1/2012 | Lassetter | |

(Continued)

OTHER PUBLICATIONS

Liang Jin et al., Efficient Record Linkage in Large Data Sets, Database Systems for Advanced Applications, 2003. (DASFAA 2003). Proceedings. Eighth International Conference on Mar. 26-28, 2003. URL: http://ieeexplore.ieee.org/abstract/document/1192377/ (aBSTRACT ONLY pp. 1-3).

(Continued)

*Primary Examiner* — Kimberly L Wilson
(74) *Attorney, Agent, or Firm* — Daniel Morris; Otterstedt, Wallace & Kammer, LLP

(57) ABSTRACT

A given query entity of a query database and a set of reference entities from a master database are accessed; each entity accessed corresponds to an entry in a respective database, which is mapped to a set of words that are decomposed into tokens. For each reference entity, a closest token is identified therein for each token of the given query entity, via a given string metric. A number of closest tokens are thus respectively associated with highest scores of similarity between tokens of the query entity and tokens of each reference entity. An entity similarity score is computed based on said highest scores. A reference entity of the master database is identified, which is closest to said given query entity, based on the entity similarity score. Records of the given query entity are linked to records of the master database, based on the closest reference entity identified.

17 Claims, 9 Drawing Sheets

(56) References Cited

U.S. PATENT DOCUMENTS

| | | |
|---|---|---|
| 8,843,492 B2 | 9/2014 | Cao |
| 2009/0171759 A1* | 7/2009 | McGeehan ............ G06Q 40/00 |
| | | 705/35 |
| 2012/0271827 A1* | 10/2012 | Merz ................ G06F 16/90344 |
| | | 707/737 |
| 2013/0124525 A1* | 5/2013 | Anderson ........... G06F 16/3338 |
| | | 707/737 |
| 2014/0330845 A1 | 11/2014 | Feldschuh |
| 2015/0286713 A1* | 10/2015 | Zhang ..................... G06N 5/02 |
| | | 707/749 |
| 2016/0267154 A1 | 9/2016 | Hazlewood |
| 2017/0212899 A1 | 7/2017 | Lightner |
| 2020/0184100 A1* | 6/2020 | Ong ................... G06F 9/44505 |

OTHER PUBLICATIONS

Matthew A. Jaro, "Advances in Record-Linkage Methodology as Applied To Matching The 1985 Census of Tampa", Florida. J. Amer. Statist. Assoc. 84, 406 (1989), 414-420.

V. I. Levenshtein, "Binary Codes Capable of Correcting Deletions, Insertions and Reversals", Soviet Physics Doklady 10, 8 (Feb. 1966), 707-710.

Alexandr Andoni et al., "Polylogarith-mic Approximation for Edit Distance and the Asymmetric Query Complexity" (2010). pp. 1-42.

William W Cohen, "Integration of heterogeneous databases without common domains using queries based on textual similarity", In ACM SIGMOD Record, vol. 27. ACM, 201-212, 1998.

Ahmed K Elmagarmid, et al., "Duplicate record detection: A survey", IEEE Transactions on knowledge and data engineering 19, 1 (2007), 1-16.

* cited by examiner

| Master database entry label | Textual description |
|---|---|
| POWER7 | "POWER7 refers to superscalar symmetric multiprocessors based on the Power Architecture and released in 2010." |
| POWER8 | "POWER8 refers to superscalar symmetric multiprocessors based on the Power Architecture and became available in 2014." |
| POWER9 | "POWER9 refers to superscalar symmetric multiprocessors based on the Power Architecture and was announced in 2016." |

FIG. 3

| Master database entry label | Cleaned, tokenized form |
|---|---|
| POWER7 | {POWER7, superscalar, symmetric, multiprocessors, Power, Architecture, released, 2010} |
| POWER8 | {POWER8, superscalar, symmetric, multiprocessors, Power, Architecture, available, 2014} |
| POWER9 | {POWER9, superscalar, symmetric, multiprocessors, Power, Architecture, announced, 2016} |

FIG. 4

| Query database entry label | Textual description |
|---|---|
| Unlabeled entry #1 | "The POWER7 executes instructions out-of-order." |
| Unlabeled entry #2 | "The POWER7 has approximately 1.2 billion transistors." |

FIG. 5

| Query database entry label | Cleaned, tokenized form |
|---|---|
| Unlabeled entry #1 | {POWER7, executes, instructions, out-of-order} |
| Unlabeled entry #2 | {POWER7, 1.2, billion, transistors} |

SIMILARITY MATCHING SYSTEMS AND METHODS FOR RECORD LINKAGE

BACKGROUND

The invention relates in general to the field of computer-implemented methods and systems for record linkage. In particular, it is directed to computerized methods that rely on similarity matching of tokenized database entities to perform automatic record linkage.

Data has become a precious source for enterprise decision making. For instance, in the information technology (IT) industry, strategical marketing decisions are often made based on information regarding products installed at customers' sites and products already sold to such customers. Such information is available through internal and commercial datasets which are often scattered over multiple computers or storage systems. In addition, the relevant information is often available through heterogeneous or dissimilar representations. In such cases, one first needs to link items present in the various datasets, in order to be able to get full insights from such items.

Of particular interest is the record linkage of data entities, such as descriptions of products, services and company names. Different and yet related descriptions of such items is often found in several datasets. Differences across the item representations may include different formats, synonyms, abbreviations, acronyms and also typographical errors. The challenge is, under such circumstances, to be able to match descriptions corresponding to a same item.

Assume that a dataset of entities are available, which together make up a master database. The objective is to match records of a given query database (i.e., another, similar dataset) against the master database. One way to achieve this is to find the best matching catalog entry for each item from the query database. Now, both the query and master databases are results of human work. E.g., their vocabulary is likely not standardized, and the entity descriptions may contain typos, omissions, and other spelling variations.

To find the best matches, a quantitative similarity measure is needed, to handle inconsistencies such as mentioned above. Assuming that such a similarity measure is available, matching query records against a master database likely implies to compare a large number of items for similarity. Notwithstanding, the amount of training data may be limited, which prohibits direct applications of advanced machine learning and probabilistic record linkage techniques. In such a context, another type of automatic record linkage technique is needed, which ideally should be fast and efficient.

State-of-the-art methods of record linkage notably include fuzzy or probabilistic record linkage, based on machine learning and deep learning models. However, such techniques cannot be used in a context where the amount of training data is limited, as noted above. Thus, other methods need be devised, which allow for certain statistical inference.

A number of algorithms are available, which measure the distance between strings for approximate matching. They implement a distance metric or, closely related, a similarity score that maps two input strings to a number. Smaller distance or, equivalently, higher similarity score values indicate higher similarity. String similarity metrics can be roughly classified into edit-distance based metrics and token-based metrics.

Edit-based measures express similarity by counting the number of primitive operations required to convert one string into another, i.e., insertion, deletion, substitution and transposition. Different subsets of such operations may nevertheless be considered, depending on the algorithm variant adopted. For example, the Jaro similarity measure [1] relies on the number of matching characters and necessary transpositions, whereas the Levenshtein similarity measure [2, 3] counts the number of insertion, deletion, and substitution operations required. Usually a unit cost is assigned to a single operation and the sum of all costs is returned as the distance between strings. A variant is the Damerau-Levenshtein distance. Different cost values can be assigned to individual operations leading to the weighted Levenshtein distance. Any distance accordingly computed can be turned into a quantity that measures the similarity. For example, a similarity measure s can be expressed as the opposite of a distance d (s=−d) or as an affine function of d, whose coefficient is the reciprocal of the maximal length of the two strings $w_1$, $w_2$ compared, i.e., $s=1-d/\text{Max}(w_1, w_2)$.

Token-based distance measures consider two strings as multisets of characters. For example, the so-called WHIRL similarity [4, 5] measures the distance between two strings in terms of cosine similarity of weighted TF-IDF vectors of words, where TF-IDF stands for "frequency-inverse document frequency", which is a statistical measure for the importance of terms in a set of documents. As another example, methods based on so-called q-grams [5], which involve the TF-IDF too, divide a string into q-grams instead of words and computes the weight of each word according to its TF-IDF. The distance between two strings is computed as the cosine similarity of the weighted words.

The following papers, which illustrate the background art, address concepts that are also used in this document:

[1] Matthew A. Jaro. 1989. Advances in Record-Linkage Methodology as Applied to Matching the 1985 Census of Tampa, Fla. J. Amer. Statist. Assoc. 84, 406 (1989), 414-420.

[2] V. I. Levenshtein. 1966. Binary Codes Capable of Correcting Deletions, Insertions and Reversals. Soviet Physics Doklady 10, 8 (February 1966), 707-710.

[3] Alexandr Andoni, Robert Krauthgamer, and Krzysztof Onak. 2010. Polylogarith-mic Approximation for Edit Distance and the Asymmetric Query Complexity. (2010).

[4] William W Cohen. 1998. Integration of heterogeneous databases without com-mon domains using queries based on textual similarity. In ACM SIGMOD Record, Vol. 27. ACM, 201-212.

[5] Ahmed K Elmagarmid, Panagiotis G Ipeirotis, and Vassilios S Verykios. 2007. Duplicate record detection: A survey. IEEE Transactions on knowledge and data engineering 19, 1 (2007), 1-16.

SUMMARY

According to a first aspect, the present invention is embodied as a computer-implemented method of record linkage. First, a given query entity of a query database and a set of reference entities from a master database are accessed, wherein each entity accessed corresponds to an entry in a respective database, which entry is mapped to a set of words that are decomposed into tokens. Next, for each token of the given query entity, a closest token is identified in each reference entity of the set of reference entities considered. This is achieved thanks to a given string metric. That is, a number of closest tokens are identified in said each reference entity, which are respectively associated with highest scores of similarity (or, equivalently, smallest distances) between tokens of the query entity and tokens of said each reference entity. Then, an entity similarity score between said given query entity and said each reference entity is computed, based on said highest scores of similarity. A reference entity of the master database is subsequently identified, based on the entity similarity score computed for each of the reference entities, which is closest to said given query entity. Finally, records of the given query entity are linked to records of the master database, based on the closest reference entity identified. A similar process can be carried out for a number of query entities, e.g., as obtained by decomposing a query database.

According to another aspect, the invention is embodied as a computerized data management system that is specifically configured to implement a method such as described above.

A final aspect of the invention concerns a computer program product for linking records of a given query entity to records of a master database. The computer program product comprises a computer readable storage medium having program instructions embodied therewith, where the program instructions are executable by one or more processors, to cause to take steps according to the above method.

Computerized systems, methods, and computer program products embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements, and which together with the detailed description below are incorporated in and form part of the present specification, serve to further illustrate various embodiments and to explain various principles and advantages all in accordance with the present disclosure, in which:

FIGS. 1-13 illustrate, step-by-step, a method for linking records from distinct databases, wherein query entities from a query database are matched to closest reference entities from a master database, based on similarity scores computed from closest distances between tokens of such entities, as in embodiments. Use is made of purposely simple examples of database entries, as well as tables and matrices, which illustrate successive operations performed according to this method;

The accompanying drawings show simplified representations of devices or parts thereof, as involved in embodiments. Similar or functionally similar elements in the figures have been allocated the same numeral references, unless otherwise indicated.

DETAILED DESCRIPTION

The following description is structured as follows. First, computerized methods of record linkage are described (sect. 1). The next sections concern related computerized systems and computer program products (sect. 2 and 3).

1. Computerized Methods of Record Linkage 1.1 High-Level Description of the Method and Variants Thereto In reference to FIGS. 1-16, an aspect of the invention is first described, which concerns a computer-implemented method of record linkage. The context is assumed is to be the same as the context discussed in the background section. On the one hand, a set of entities are available, which together form a master database 10. There, the objective is to match records of a given query database 20 against records from the master database 10. To that aim, one needs to find the best-matching catalog entry for each item from the query database 20, which requires a quantitative similarity measure that makes it possible to cope with inconsistencies between item descriptions in data entities from the two databases 10, 20.

Figure 1:
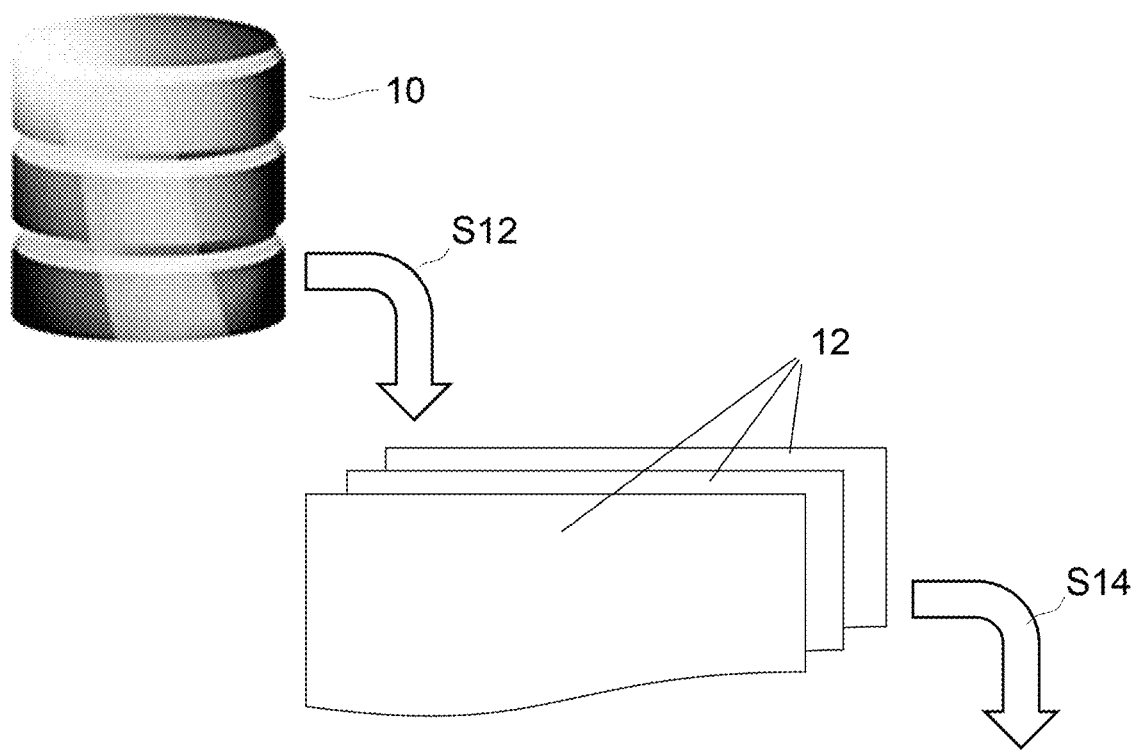
Figure 2:
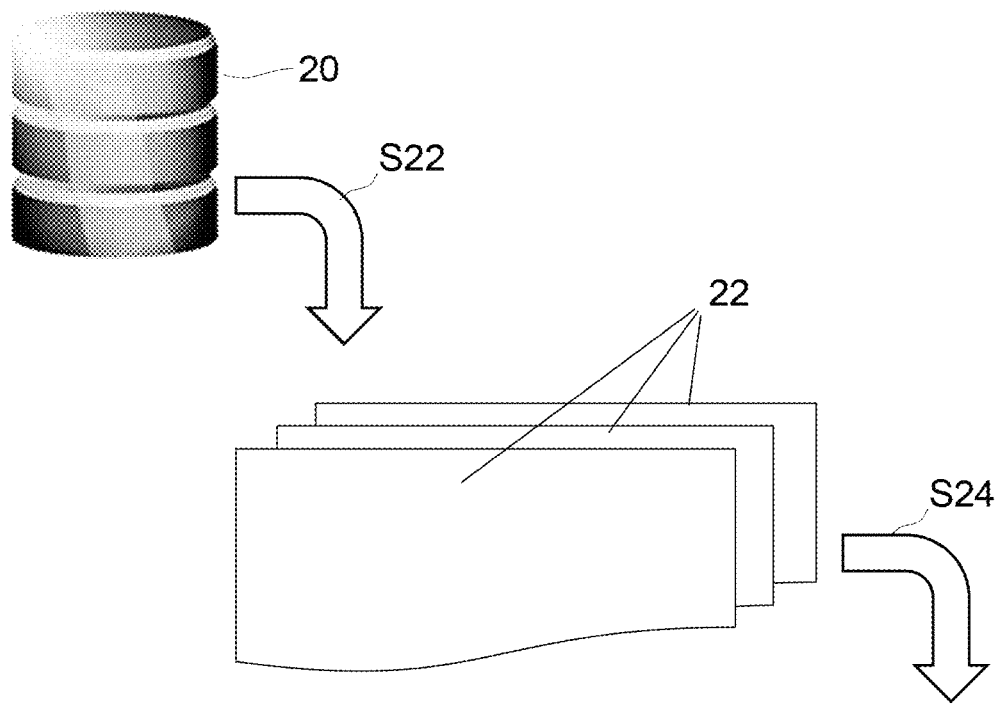

Thus, two databases 10, 20 are available, which consist of a reference database 10 (likely the largest database) and a query database (likely the smallest), as depicted in FIGS. 1, 2. In fact, and notwithstanding depictions used in FIGS. 1, 2, the respective datasets may be stored on a single storage unit, or on more than two storage units. That is, a "database" as understood herein must be construed as a more or less structured set of data (possibly available through different file formats), and held in a computerized system, which may involve one or more storage units, on which such a set of data is stored. Basically, the aim is to link records from the query database 20 to records from the reference database 10. To achieve this, the method proposed compares items from the query database 20 with items from the master database 10. Yet, because such comparisons may easily become intractable, some simplification is required, the key being to find a sound level of simplification, so as not to compromise the subsequent data linkage. This is achieved as described below. This method is first described in reference to the flowchart of FIG. 14 and with respect to a given query entity, whose records are to be linked to records of a most similar entity in the reference database. The method is then exemplified, step-by-step, in reference to FIGS. 1-13.

Figure 14:
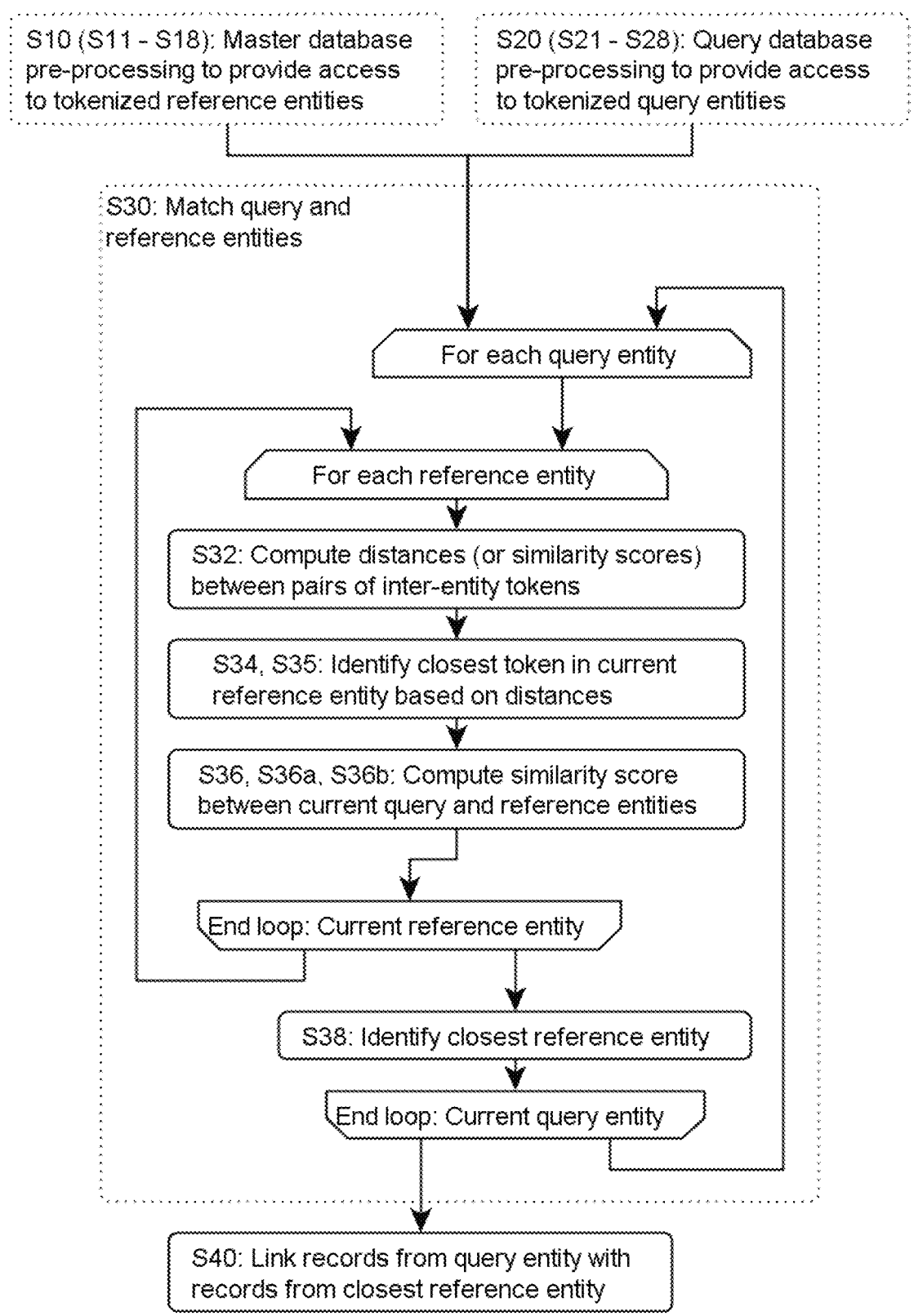
FIG. 14 is a flowchart illustrating high-level steps of such a method, as in embodiments.

First, referring to FIG. 14, a given query entity 23, 26 from the query database 20 and a set of reference entities 16 from a master database 10 need be accessed at some point. Providing access to such entities may possibly require some data pre-processing, as generally denoted by references S10, S20 in FIGS. 14-16. Such data pre-processing may in fact involve a number of pre-processing steps, denoted by references S11-S18, S21-S28 and later described in reference to FIG. 15.

Each entity 16, 26 accessed at steps S18, S28 corresponds to an entry 13, 23 in a respective database 10, 20, which entry is mapped to a set of words. Initially, such sets of words may typically be sentences, or any form of descriptions 14, 24 in a natural language. Yet, at some point, such descriptions are decomposed into tokens 16, 26.

Assuming that tokenized forms of the considered entities are available, some comparison is carried out for each reference entity of the considered set of entities 16 from the master database 10, whereby a given query entity is compared to each reference entity. First, and for each token of the given query entity 23, 26 considered, a closest token 35 is identified S32-S35 in said each reference entity 16, according to any suited string metric. That is, scores of similarity 34 can be associated to pairs of tokens in each entity pair considered; the closest tokens 35 that are eventually identified S35 in a reference entity are those that are respectively associated with the highest scores of similarity 34 with the tokens from the query entity 23, 26. That is, for each token from the query, a closest token is identified in the reference entity that is being compared to the query entity.

Then, an entity similarity score 36, 36a, 36b is computed S36, S36a, S36b, which measures the similarity between said given query entity 23, 26 and each of the compared reference entities 16. The entity similarity scores are computed based on the highest scores of similarity 34 found for each token from the query entity.

Next, a reference entity is identified S38 as being the closest to said given query entity 23, 26, based on the entity similarity scores 36, 36a, 36b computed for each of said reference entities 16. Finally, records 24 of the given query entity can be linked to records 14 of the master database 10, based on the closest reference entity identified for that query entity.

Token-based distances as used herein imply a tokenization S16, S26, whereby a string sequence is split into words and/or other symbols (e.g., concatenated words), using such separators as whitespace, line break, and/or punctuation characters. Tokens provide a suited granularity for the problem at hand, whereby comparisons are initially performed at the level of tokens. Most similar tokens are those that have highest scores of similarity with tokens from the query entity 26 or, equivalently, those that are at the smallest distance from such tokens. Note, although similarity measures and distances will typically vary oppositely or inversely (a smaller distance yields a larger similarity), any form of similarity measures is, in some way, an appreciation of a distance between two items. Thus, similarity measures and distances are generally considered to be equivalents for the purpose of implementing this invention, unless otherwise stated, e.g., as in embodiments specifically relying on specific similarity definitions, which are described later.

The token comparisons S32 may be performed based on a vocabulary of unique tokens of the master database 10, in order to reduce the number of such comparisons. Preferably though, the token comparisons are performed for each reference entity 16 (one after the other) and for all tokens therefrom, using mere loops, as assumed in FIG. 14. Reasons for doing so is that the descriptions 14, 24 shall, once tokenized, often include distinctive (and therefore unique) words. Also, the number of entities may be very large, and typically much larger than the average number of words per entity. In such a case, maintaining a vocabulary of unique tokens may be computationally demanding, especially where frequent updates of the mater database are required. Thus, it may finally be easier to compute distance matrices between all token pairs for each pair of entities considered. In all cases, however, the entity similarities can be computed S36 based on the sole highest similarity scores obtained S34, S35 for tokens from the query entities, which drastically reduces the complexity of the entity comparison S36-S38.

It remains that, if $\langle n \rangle$ is the average number of tokens per entity and N is the number of reference entities that need be compared to a query entity, the complexity of the first operations S32 scales as $N \langle n \rangle^2$ if performed for each of the $\langle n \rangle$ tokens (on average) of the query entity and each of the $\langle n \rangle$ tokens (on average) of the reference entities, whereas it would scale as $\langle n \rangle n_u$, if a vocabulary of $n_u$ unique words is maintained. As $n_u$ should be much less than $N \langle n \rangle$ in practice, the use of a vocabulary should in principle be more efficient. However, such a benefit becomes questionable when the number of unique, distinctive words become proportionally more important, as in databases of company names, commercial products and services. All the more, a vocabulary of unique tokens need be updated after each record linkage operation and additional operations are subsequently required at step S36, in order to identify which score is associated with which token of each of the N reference entities. Thus, mere loops may suffice to perform the token comparisons, as assumed in FIG. 14, though parallelization may be contemplated, in variants.

In all cases, the tokenized approach chosen here for entity comparisons can be made fully or (at least partly) independent from the token order in each entity. The use of a similarity measure allows fuzzy matching of tokens, which is resilient to typos and other inconsistencies. Another advantage compared to prior art methods is that present methods do not require the words to be split into q-grams, so that the word semantics (which can be very strong in entity descriptions as considered here) does not get lost. Preferably, the Levenshtein similarity measure is used to capture small inconsistencies between tokens, as it allows typos and other small inconsistencies to be taken into account. In addition, fast implementations of the Levenshtein similarity algorithm are available, which may, in some cases, be computed in near-linear time [3]. Thus, variants to the Levenshtein similarity measure can be contemplated. More generally though, any suitable similarity measure can be envisaged.

Assume, that the databases 10, 20 already include data entities that are in a suitable shape for comparison purposes, which might require some pre-processing, as later described in reference to FIGS. 1, 2. For example, FIGS. 3-6 depict tables 12, 22, which aggregate several entities 13, 14 and 23, 24 from the databases 10, 20. Note, tables are used for the sake of illustration only: the actual entities 13, 14 and 23, 24 may actually be internally stored under any suited format. Initially, such entities correspond to respective entries 13, 23, which may be labelled (e.g., "POWER7", "POWER8", etc., as in entities obtained from the master database 10), or not (as in entities 23, 24 obtained from the query database). Such entries are mapped to respective sets of words 14, 24, which initially may be mere descriptions of the corresponding entry labels. E.g., "POWER7 refers to superscalar symmetric multiprocessors based on the Power Architecture and released in 2010". Next, such descriptions 14, 24 are tokenized (and possibly cleaned to get rid of stop words and the likes) during respective steps S16, S26, which are likely performed at different times, for reasons discussed later. The tokenization yields, e.g., vector representations 16, 26 of words as depicted in FIGS. 4, 6 with respect to entities from the two databases 10, 20.

Next, referring back to FIG. 14, steps S32-S35 aim at identifying closest tokens 35 in the master database and, this, for each of the tokens of the query entity considered. Such steps may be carried out by first computing S32 all scores 32 of similarity between tokens of the query entity and tokens from the master database, as noted earlier. E.g., such scores can be computed for each pair of tokens and for each pair of entities considered. For example, assume that two query entities $q_1$, $q_2$ are to be successively processed (which respectively include 4 and 5 tokens, after tokenization) for comparison against three reference entities $\mu_1$, $\mu_2$, $\mu_3$, which include 8 tokens each, after tokenization, as in the example of FIGS. 7-12. In this example, the three reference entities $\mu_1$, $\mu_2$, $\mu_3$ form a reduced set of reference entities that are considered for comparison with $q_1$ and $q_2$ (considering one query entity $q_j$ at a time). This set may well have been inferred based on a history of previous queries or by clustering, as later described in reference to FIGS. 15 and 16.

In this example, the comparisons performed at step S32 give rise to 2×3=6 distance matrices. The upper matrices in FIG. 7 comprise, each, 4×8 distances, whereas the lower matrices comprise, each, 5×8 distances, owing to the numbers of tokens in each entity considered. Such distances are computed according to a chosen string metric (here the Levenshtein metric), and the scores 32 computed so far reflect pair distances 32 between respective tokens from the query entities $q_1$, $q_2$ from a query database 20 and tokens from the entities $\mu_1$-$\mu_3$ from the master database 10.

Figures 7, 8, 9, 10, 11, 12:
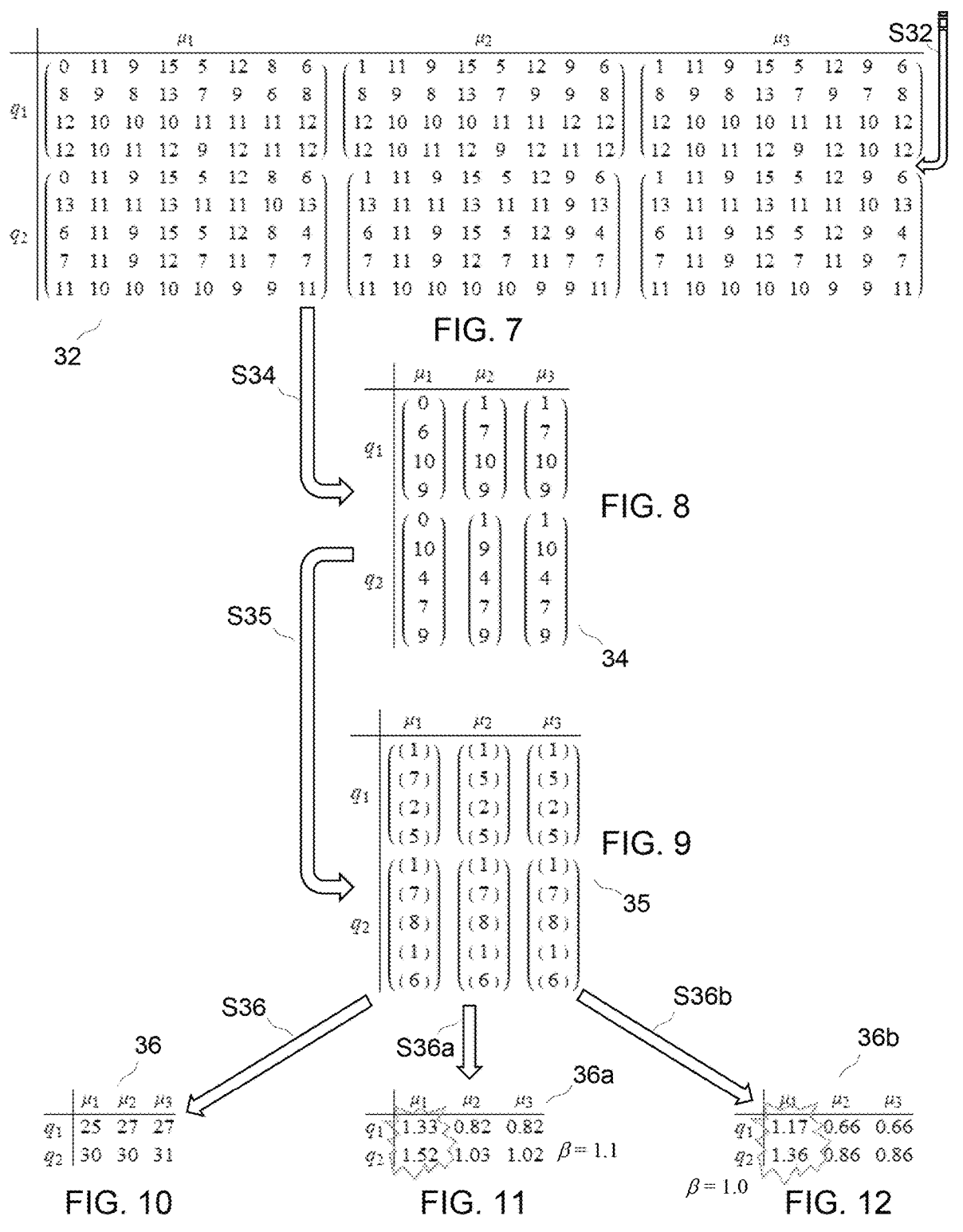

Then, closest tokens 35 can easily be identified S34, S35 for each token of the given query entities $q_1$, $q_2$, in each of the reference entities $\mu_1$-$\mu_3$, based on the distances 32. In that respect, FIG. 8 shows the minimal distances 34 (thus corresponding to highest scores) to each query token, which correspond, each, to minima from each matrix row of FIG. 7. The corresponding tokens from the reference entities $\mu_1$-$\mu_3$ are identified in FIG. 9, which depict positions (indices) of such tokens. Note, although distances are reported in FIGS. 7, 8 and 10, for the intelligibility of the description of the present examples, similarity scores (expressed as, e.g., opposite of distances or reciprocal of translated distances) could have used as well.

When degenerated distance minima (or score maxima) are found, any corresponding reference token could be selected, which has little impact in practice. For example, consider the $q_1$-$\mu_1$ matrix of FIG. 7: here the minimal pair distance found for the first token of $q_1$ (upper row of the matrix) is 0, which value is accordingly identified and reported in the $q_1$-$\mu_1$ vector of FIG. 8. The value is indeed 0 as it measures the distance between identical tokens ("POWER7") in that case. And the corresponding reference token is indeed the first one of the upper word vector of FIG. 4, whence the value 1 reported in the first vector element of the $q_1$-$\mu_1$ vector of FIG. 9. However, the closest distances found between the third token of $q_1$ (i.e., "instructions") and any token of $\mu_1$ is 10, which minimal value is degenerated because the word "instructions" is as close from "superscalar", "symmetric", or "multiprocessors", according to the standard Levenshtein metric (i.e., the number of one-element deletions, insertions, and substitutions required to transform the first word into the second). There, it does not matter which corresponding token of $\mu_1$ is identified as the closest token; the token position reported in the $q_1$-$\mu_1$ vector of FIG. 9 corresponds to the position (2) of the second token of $\mu_1$ in that case, i.e., the first token among the three that gives the distance of 10.

Next, further referring to FIGS. 10-12, the entity similarity score 36, 36a, 36b is preferably performed by summing S36, S36a, S36b highest scores of similarity 34 associated with the closest tokens 35 identified at step S35 (FIG. 9) in each of the reference entities 16 considered. Importantly, only the highest scores (or smallest distances) obtained for each of the query entities are considered to compute the entity similarities. In the example of FIG. 10, the smallest distances obtained for each token of $q_1$, $q_2$ (FIG. 9) are simply summed, yielding a cumulated distance matrix that already designates the reference entity $\mu_1$ as closest entity to $q_1$, in accordance with expectations from FIGS. 4, 6. Note, the sum may possibly be normalized in practice (e.g., by the sum of tokens in the respective query entities), contrary to the calculation used for FIG. 10. Now, FIG. 10 also shows that entities $\mu_1$ and $\mu_2$ are found at an equal overall distance from $q_2$, when simply summing the smallest distances obtained for each token of $q_2$. This is due to some compensation. Therefore, a similarity measure s is preferably used, instead of a mere cumulated distance, which can for instance be expressed as the reciprocal of a translated distance d. E.g., $s=1/(1+d^k)$, where k is some integer (for example k=1, as used to obtain the values reported in FIG. 11). Such a measure favors exact matches. Accordingly, $\mu_1$ and $\mu_2$ are now found to be the closest entities from $q_1$ and $q_2$, respectively.

Comments are in order. First, different expressions of the similarity measure s could be used, instead of $s=1/(1+d^k)$. For example, one may use the expression $s=(1+d)^{-k}$, where k is some positive integer ($k\geq 1$). As another example, one may use the expression $s=1-d/\text{Max}(w_1, w_2)$, as noted earlier. Such variants to the expression of the similarity measure do, qualitatively, not impact the results, inasmuch as they all lead to the same conclusion, i.e., $\mu_1$ and $\mu_2$ are the closest entities from $q_1$ and $q_2$, respectively. Minor differences may, however, be observed. For example, depending on the actual expression used, the similarity between $q_1$ and $\mu_1$ may be found to be larger than the similarity between $q_2$ and $\mu_2$, contrary to the results obtained with $s=1/(1+d)$, as used to compute the results shown in FIGS. 11 and 12. Finally, a threshold coefficient β may be used, to discard potential matches, as depicted in FIGS. 11 and 12. This point is discussed later in detail.

As seen in FIG. 4, two types of tokens may be considered, i.e., alphanumeric tokens vs. non-alphanumeric tokens. As it may be realized, alphanumeric tokens (i.e., containing both alphabetical and numerical strings) will be much more distinctive in practice, whence the importance of such tokens. The latter could therefore be given more weight in the computation of entity similarity scores, as in step S36b, FIG. 12. The other type ("non-alphanumerical") of tokens may for instance be defined as tokens that are free of characters (e.g., letters) and/or digits. E.g., these may for example be all tokens that are free of any digit, as assumed in FIG. 12. In that case, the highest scores of similarity 34 (as obtained after step S34) may further be weighted S36b differently, depending on whether they are associated to closest tokens 35 of the first type or of the second type, as in FIG. 12, where weights of 1 are assigned to scores of alphanumeric tokens, whereas scores for query tokens free of digits receive weights of 0.5 only, in this example. Again, for the process of decision making whether a match has occurred or not, a decision threshold β could be used.

More explicitly, the entity similarity scores LT may advantageously be computed S36b, for any two entities, according to:

$$LT = \frac{\sum_{i=1}^{n} \alpha \cdot s(t_i) \cdot 1(t_i \in \bar{\mathcal{A}}) + s(t_i) \cdot 1(t_i \in \mathcal{A})}{\sum_{i=1}^{n} \alpha \cdot 1(t_i \in \bar{\mathcal{A}}) + 1(t_i \in \mathcal{A})},$$

where α is the weight assigned to the highest scores $s(t_i)$ retained for non-alphanumeric tokens, i.e., $t_i \in \bar{\mathcal{A}}$, wherein, e.g., α∈(0,1]. On the contrary, highest scores $s(t_i)$ retained for alphanumeric tokens $t_i \in \mathcal{A}$ are assigned a weight equal to 1. Use was further made of the indicator function $1(t_i \in \mathcal{X})$, which function outputs 1 if $t_i \in \mathcal{X}$ and 0 otherwise.

Figure 17:
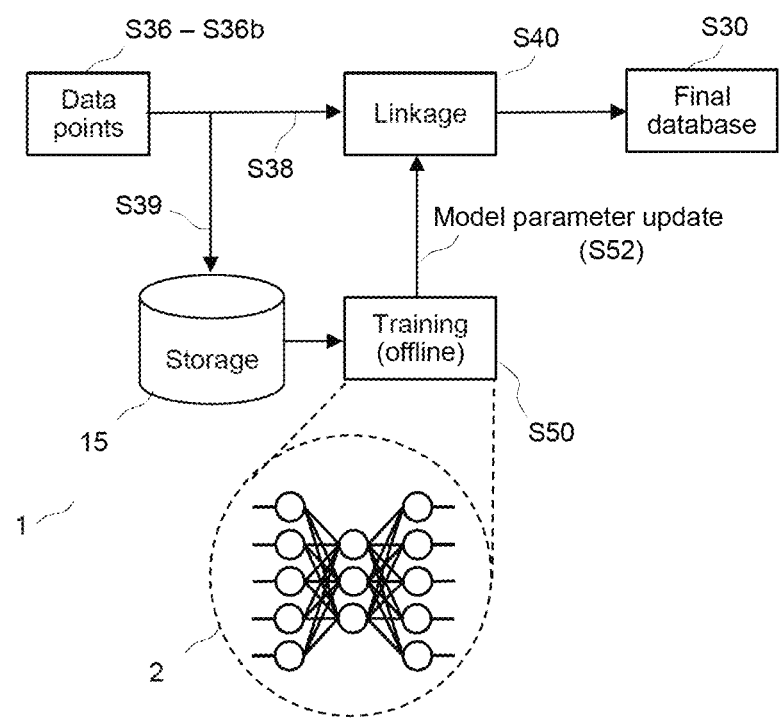
FIG. 17 is a diagram that schematically represents a data management system, involving a machine-learning subsystem to learn parameters involved in methods for linking records according to embodiments.

Referring now to FIG. 17: in embodiments, a machine-learning model 2 may further be trained S50 for it to learn optimal values for α or, equivalently, the relative weight α: 1 as used to weight the highest scores of similarity 34 summed at step S36b. Concurrently, the same (or a distinct) model 2 may be used to learn optimal values of the threshold parameter β. Learning can for instance be achieved based on successive query entities that are processed S32-S38 to link records 24 associated to such query entities to records 14 of the master database 10. E.g., a supervised training S50 is preferably relied upon. This is discussed later in detail.

Assuming that a threshold parameter β is available, records 24 of a given query entity 23, 26 can eventually be decided to be linked to records 14 of the master database 10 only if the entity similarity score found S38 for the closest reference entity is larger than this parameter β, as highlighted in FIG. 11 or 12. For example, assuming that an optimal threshold was found, which is equal to 1.1, only the entity similarity scores obtained, which exceed this value, could be retained as effective matches, whereas other entities would be discarded. Similarly, a threshold value of β=1.0 would, in the example of FIG. 12, immediately discard entities $\mu_2$ and $\mu_3$ as potential matches. This also means that no match may possibly be found, which would eventually lead to create a new, independent entry in the master database (without any linkage), upon integrating records corresponding to the queries processed. In other cases, several matches may possibly be found, this possibly causing multiple record linkages.

Figure 13:
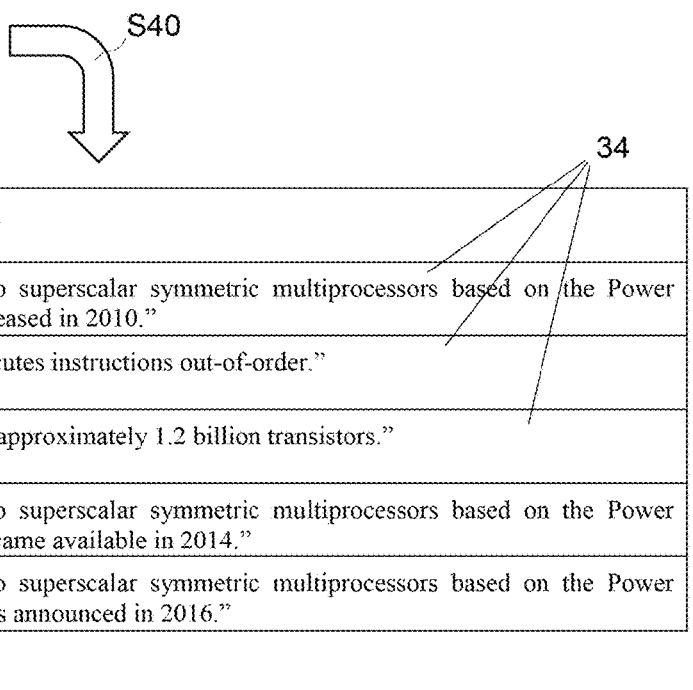

When an entity (e.g., $\mu_1$) is retained as a match (as assumed in FIGS. 11, 12), then records associated to the queries $q_1$, $q_2$ can be accordingly linked to an entry of the matching entity. For example, in FIG. 13, a match is assumed to be found for each of $q_1$ and $q_2$ with the first reference entity $\mu_1$, hence leading to an integration S40 of records corresponding to $q_1$ and $q_2$ that are linked to records of $\mu_1$. That is, the same entry "POWER7" is now mapped to each record of the previously unlabeled query entities $q_1$ and $q_2$. Again, the tabular representation of FIG. 13 is merely a guide for the eye.

Figure 15:
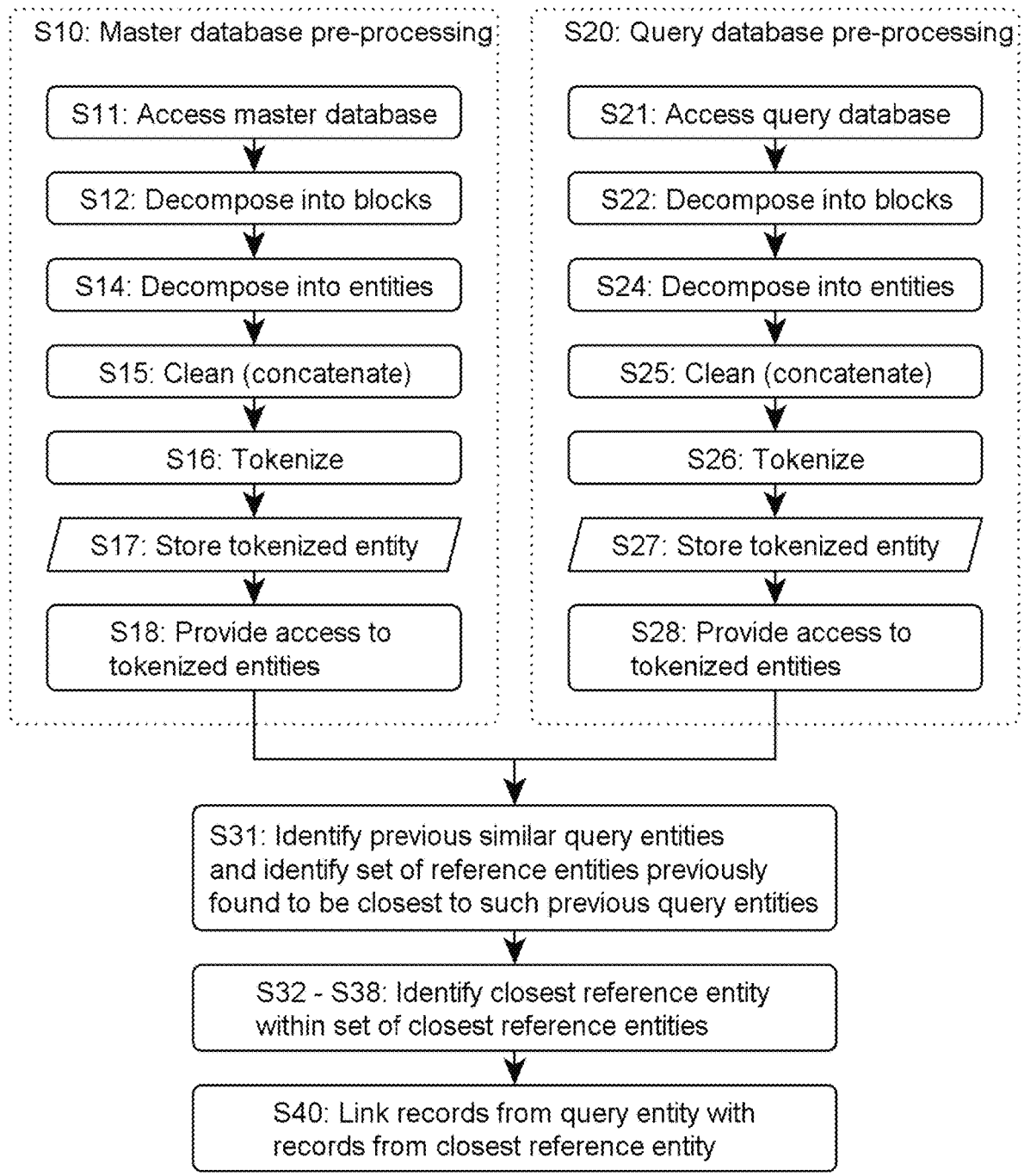
FIG. 15 is a flowchart capturing high-level steps of a variant to the method of FIG. 14, wherein previously processed query entities are used to restrict the set of potential matches in the reference database and thereby accelerate the linkage. In addition, FIG. 15 show detailed steps for pre-processing the query and reference databases, as involved in embodiments.

At present, the pre-processing steps S11-S18 and S21-S28 are discussed in more detail. Such steps will typically not be performed concurrently. For example, the master database 10 may be continually updated, e.g., as a background task upon integrating new data therein, such that tokenized versions 16 of the records 14 are constantly available. For example, tokenized versions 26 of any new records 24 may be stored upon integrating such records 24 in the master database 10. Still, a first-time implementation of the present methods may require to perform pre-processing steps S11-S18 as depicted in FIG. 15, which are here assumed to be mere counterparts of steps S21-S28, as performed in respect of query entities.

Any new query may be processed one at a time, i.e., one after the other, although parallelization may be available, in variants. Referring back to FIGS. 5, 6, when a given query entity 23, 24 from the query database 20 is to be accessed S28 for matching against entities of the master database 10, this query may first be processed according to steps S21-S27. This query entity 23, 24 corresponds to an entry 23 of the query database, which entry 23 is mapped onto a textual description 24. As said earlier, this query entity 23, 24 may first need be pre-processed, so as to decompose S26 the textual description 24 into tokens 26. In variants, however, query entities may have been pre-processed at an earlier stage and thus be readily processed for matching again the master database 10.

Moreover, additional steps may be required. For instance, the decomposition of the textual description 24 may include sub-steps S25, S26, whereby some of the consecutive words of the textual description 24 are concatenated S25 to form corresponding tokens 26. Reasons for doing so is that composite words and other signs in databases of commercial names are often spelled differently (sometimes separated by a space or dash, or not separated at all). Thus, concatenation steps S15, S25 are preferably performed so as to increase the chance for same entity records to be identically spelled, eventually. Incidentally, this results in decreasing the number of tokens per entity, after tokenization S16, S26. For example, common variants of the IBM name, be they correctly spelled or not (e.g., "International Business Machines", "International-Business-Machines", etc.), could all be concatenated to form the basis of a same elemental record, which may later on be transformed into a same record (e.g., "IBM").

In addition, consecutive words (i.e., strings) may be concatenated at steps S15, S25 so as to include, on the one hand, a string of characters (e.g., purely alphabetical characters) and, on the other hand, a string of digits, to form alphanumeric tokens that involve, each, both letters and numerals, for the reasons mentioned earlier. For example, as "POWER7" may possibly appear in some description, incorrectly spelled as "POWER 7", the two consecutive strings "POWER" and "7" may be sought to be concatenated to form "POWER7". More weight can be given to such tokens upon summing S36b scores of token pairs to obtain the entity scores, as these happens to be much more distinctive in practice for applications as contemplated herein. Still, even in such cases, the minimal granularity chosen for the tokens remains words. I.e., each token includes at least a word from the initial description 14, 24, which word is possibly augmented by another string. Other approaches are known, which could also be used in the context of this invention to capture discriminative words. Examples are mentioned later.

In addition, and prior to tokenizing records 14, 24, additional cleaning S15, S25 may be required, to get rid of stop words and the like, as usual. After tokenization S16, S26, tokenized versions 16, 26 of the entity records 14, 24 can be suitably stored, so as to be readily accessible S18, S28 for matching purposes.

Depending on the application scenario, additional steps may be required, prior to steps S15-S17 (or S25-S27). For example, the initial databases 10, 20 may possibly not be readily utilizable for matching entities. In particular, a query database 20 may first need be decomposed S22, S24 into suited query entities (FIGS. 1, 2). In practice, the query entities obtained at step S27 may be processed S32-S36b one after the other (or in parallel), to match against a set of entities of the master database. I.e., a given query entity is selected at step S28 for matching against a set of reference entities, which are successively selected at step S18 for performing such comparisons.

Entity descriptions 14, 24 can be regarded as an arbitrary set of words. As explained earlier, matching a given pair of descriptions entails tokenizing them into individual words (or concatenated words). The resulting tokens are then pair-wisely compared to compute a similarity score. Finally, the token similarities are aggregated into an overall similarity score. As a consequence, matching a query record against a master database requires to compare a large number of tokens for similarity. For this reason, additional blocking may be used S12, S22 (FIGS. 1, 2), whereby databases 10, 20 are first decomposed into blocks 12, 22, (see also S12 and S14 in FIG. 1, and S22 and S24 in FIG. 2) to ease the subsequent comparisons S32-S36b. E.g., those blocks 22 that, clearly, are incompatible with a given block 12 need not be taken into account when attempting to match a given query entity from this given block 12.

Figure 16:
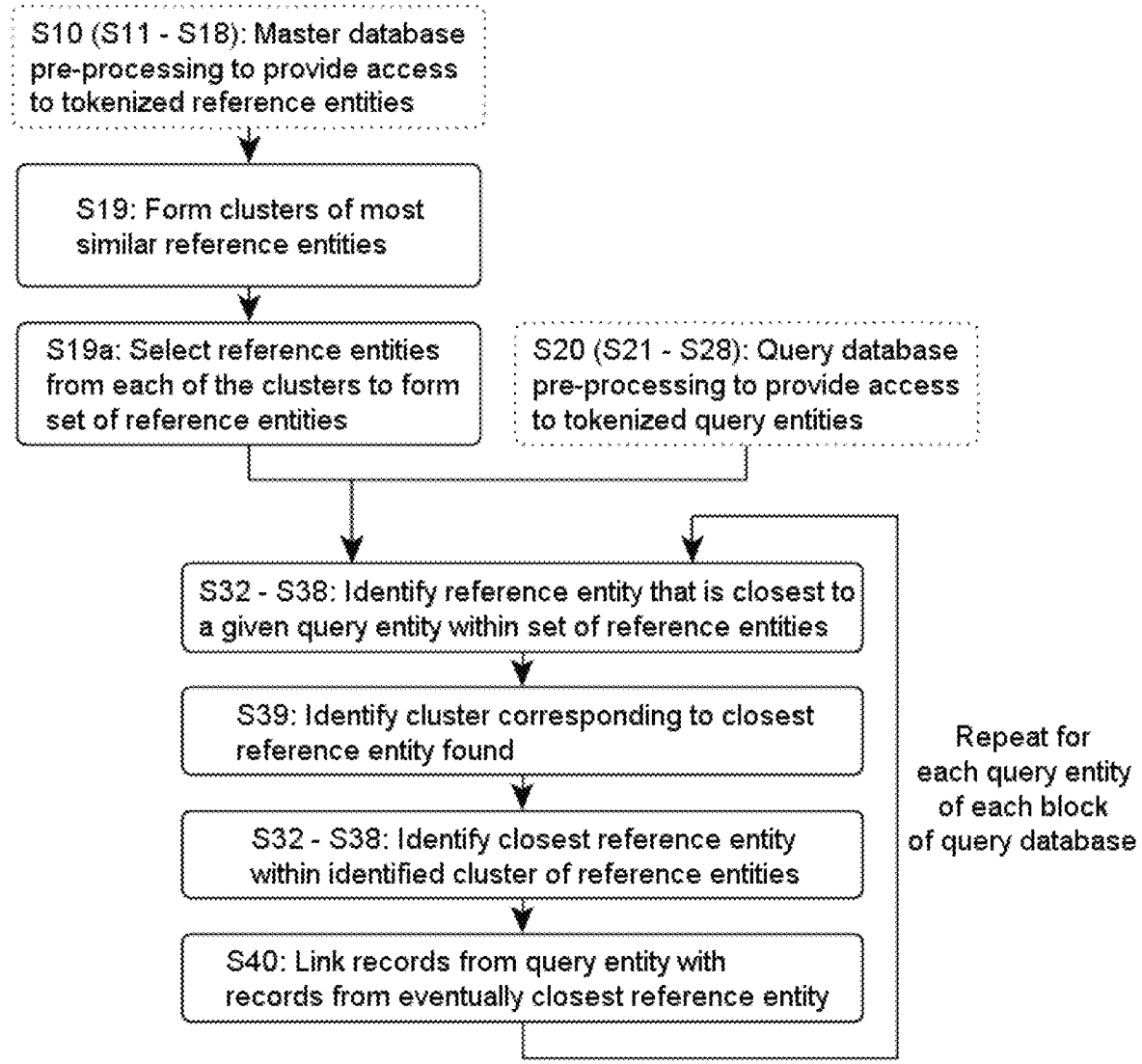
FIG. 16 is a flowchart illustrating high-level steps of another variant to the method of FIG. 14, wherein reference entities in the reference database are clustered, prior to attempting to match a query entity, to accelerate the linkage.

In addition, referring to both FIGS. 15 and 16, similar reference entities 16 of the master database 10 may advantageously be grouped S19, S19a, S31 to further restrict the set of reference entities 16 to be used for matching a given query entity. There, several approaches can be contemplated, as discussed below. In each case, the subsequent computation of the entity similarity scores can effectively be performed for a reduced set of reference entities 13, 16 from the master database 10, which improves the performance of the similarity matching system.

A first approach, which is reflected in FIG. 15, is to group S31 similar reference entities 16 based on query entities successively processed (leveraging the history of past queries). Namely, upon receiving a given query entity for matching purposes, the algorithm may first attempt to identify, among query entities that have previously been processed for record linkage (through steps such as S21-S28, S32-S38), a set of most similar query entities. Then, because closest reference entities 16 have already been identified for such previous query entities, a subset of reference entities 16 can easily be identified. Then the algorithm may attempt to match S32-S38 the given query entity received against this subset of reference entities, for record linkage purposes S40. In case no match is found, then the subset may be progressively extended to most similar reference entities, and so on.

A second approach is depicted in FIG. 16. Here, reference entities 16 of the master database 10 are clustered S19 to form clusters of similar reference entities. In a subsequent steps, reference entities are selected S19a from each of the clusters obtained S19 to form a set of dissimilar reference entities, to which a current query entity is compared. That is, the set of reference entities considered for comparison purposes now comprises reference entities selected S19a from respective clusters, which entities are therefore dissimilar, a priori. Upon completion of steps S32-S38, a closest reference entity may be identified, if any, from which another set of reference of entities may be devised, by similarity, so as to refine the comparisons S32-S38.

The reference entities can for instance be initially clustered S19 based on similar metrics and averages as described above. In variants, any similarity property may be used to cluster S19 the master database.

In both the variants of FIGS. 15 and 16, the steps aiming at identifying closest tokens 35 and closest reference entities will effectively be performed for reduced sets of the reference entities of the master database 10, which further improves the efficiency of the matching algorithm.

The above embodiments have been succinctly described in reference to the accompanying drawings and may accommodate a number of variants. Several combinations of the above features may be contemplated. Examples are given below.

1.2 Specific Embodiments of Methods of Record Linkage

Embodiments described below aim at solving the problem of entity matching for both company names and product descriptions, for which a similarity measure is desired, which is:

independent or partially independent of a token order (i.e., words or concatenated strings), resilient to small typos and text inconsistencies, and giving more weight to matching scores of discriminative tokens.

On the one hand, discriminative tokens can be defined in terms of TF-IDF weighting, as captured using, e.g., the so-called WHIRL similarity. In simpler variants, e.g., for IT products: almost all tokens that remain after cleaning may be considered as equally important in the product descriptions, subject to alphanumeric tokens, which could be given more weight, as discussed in sect. 1.1.

With this regard, a hybrid similarity measure can be used, which is based on the Levenshtein measure that is applied to tokenized product descriptions. Before applying the similarity measure, product descriptions are preprocessed by removing unnecessary punctuation, spaces, upper case, merging short tokens with consecutive numeric tokens, e.g., so as to transform "z 10" into "z10". Vendor names of products and company names get additional preprocessing by eliminating uninformative stop-words like "inc.", "corp.", etc., and by using special mapping dictionaries for brand names and acronyms, for example, "IBM"→"International Business Machines Corporation".

Besides properties described above, the similarity matching system may have parameters that can be trained for each particular use case, which makes it adaptable to different applications. Such parameters may include one or more of: the weight α of alphanumeric tokens, the importance of the token order, and the strength β of the similarity scores. As the number of parameters is small, the parameters can be trained using very limited training data that capture correct matches.

A record that represents an entity q from the query database is split into tokens $t_i$, i=1, 2, . . . , n that are compared with tokenized records from the master database. For each token in a query entity we search for the closest token $r_k$, k=1, . . . , m in a reference entity μ from the master database, thereby obtaining a corresponding, highest similarity score $s(t_i)$, which can be written:

$$s(t_i)=\text{Max}[\text{LevenshteinScore}(t_i,r_k),r_k\in\mu].$$

The scores of the query tokens are then aggregated obtaining the similarity score of the record pair. As explained in sect. 1.1, the LT similarity score for a query line q against the master entity μ can be computed as follows:

$$LT(q,\mu) = \frac{\sum_{i=1}^{n} \alpha \cdot s(t_i) \cdot 1(t_i \in \bar{\mathcal{A}}_\prime) + s(t_i) \cdot 1(t_i \in \mathcal{A})}{\sum_{i=1}^{n} \alpha \cdot 1(t_i \in \bar{\mathcal{A}}_\prime) + 1(t_i \in \mathcal{A})}$$

Imposing α∈(0, 1] makes sure that alphabetic tokens always receive a weight that is smaller than or equal to the weight of alphanumerical tokens. Various texts were performed, to verify the hypothesis about the importance of the alphanumeric tokens. A pair with the largest LT similarity score is considered to be the best match. Yet, because certain product records should not be matched, a further parameter β is used, which can be set as β∈(0, 1], provided certain normalization conditions are satisfied. If the closest record has a similarity score larger than β, the entity q from a query dataset is considered to be matched to the entity μ from the master dataset, otherwise q is considered to be unmatched.

In embodiments, only the best match, whose maximum similarity score is larger than β, could be considered as a match. In variants, the top-k matches might be considered as actual matches. Parameters α and β can advantageously be trained to achieve an optimal similarity measure. In other variants, only β is trained.

2. Computerized Data Management System

Figure 18:
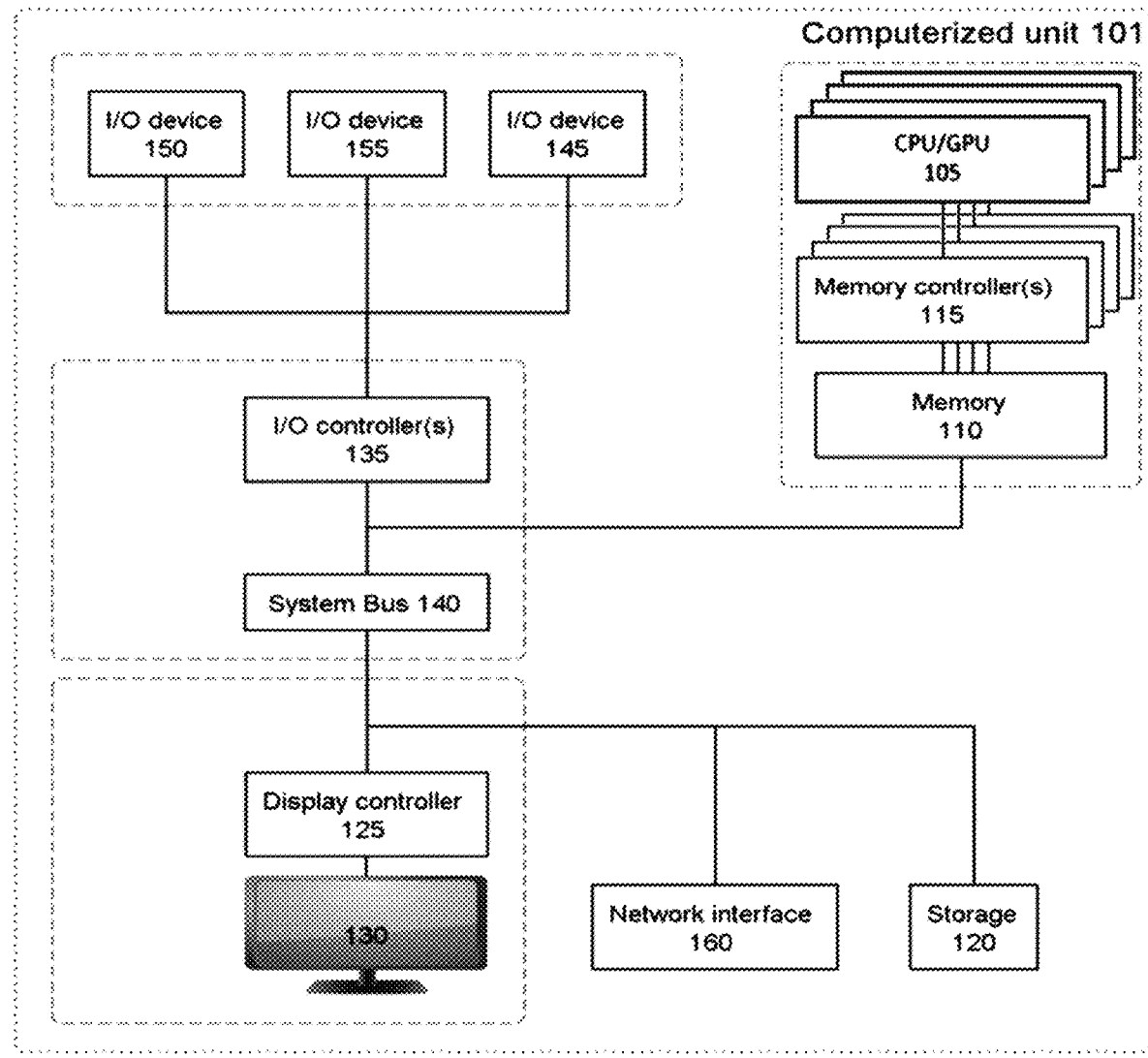
FIG. 18 schematically represents a general purpose computerized unit, suited for implementing method steps as involved in embodiments of the invention.

Referring now to FIGS. 17 and 18, another aspect of the invention is described, which concerns a computerized data management system 1. Essentially, this system is configured, both in terms of hardware and software, to perform steps of a method such as described above. To that aim, the system will comprise suitably configured processing means, memory and interface means.

Referring first to FIG. 17, the system 1 may otherwise be configured to train S50 a machine-learning model, e.g., implemented by a neural network 2, so as to learn parameters (e.g., α and β), as involved in embodiments discussed earlier. Once properly trained, the model may perform inferences as to optimal parameters α and β based on inputs. In a possible scenario, data points are collected from the query entities processed for linkage, according to methods discussed earlier. Some of the data points may be selected S39 for training purposes, and accordingly stored on a data repository 15, e.g., on any suitable memory or storage component of the system 1. The points selected at step S39 may for example be points that have been validated by an expert.

Selected data point can then be used to train S50 the network 2 offline. Upon completion of a training cycle, updated parameters (model parameter update S52) are passed to another unit 101 of the system (not shown in FIG. 17, see FIG. 18), for it to implement steps S32-S40, based on such updated parameters. Meanwhile, the model may be re-trained, based on newer training data selected at step S39, and so on.

FIG. 18 depicts a general computerized unit 101, which can advantageously be used in a system 1, to implement the present methods. Such a unit 101 notably comprises CPUs and/or GPUs configured for enabling parallelization of computerized steps, as involved in embodiments. Yet, the present methods may also involve virtual machines, e.g., in the cloud, dedicated to the large matching computations, if needed.

The unit 101 depicted in FIG. 18 may be, e.g., a general- or specific-purpose computer. In exemplary embodiments, in terms of hardware architecture, the unit 101 includes at least one processor 105, and a memory 110 coupled to a memory controller 115. Preferably though, several processors (CPUs, and/or GPUs) are involved, to allow parallelization, as noted above. To that aim, the processing units may be assigned respective memory controllers, as known per se.

One or more input and/or output (I/O) devices 145, 150, 155 (or peripherals) are communicatively coupled via a local input/output controller 135. The input/output controller 135 can be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor(s) 105 is a hardware device for executing software, particularly that stored in memory 110. The processor(s) 105 can be any custom made or commercially available processor(s), may include one or more central processing units (CPUs) and/or one or more graphics processing units (GPUs), or, still, have an architecture involving auxiliary processors among several processors associated with the computer 101. In general, it may involve any type of semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor(s) 105.

The software in memory 110 may include one or more separate programs, each of which comprises an ordered listing of executable instructions for implementing logical functions. In the example of FIG. 18, the software in the memory 110 includes computerized methods, forming part of all of methods described herein in accordance with exemplary embodiments and, in particular, a suitable operating system (OS) 111. The OS 111 essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard and mouse can be coupled to the input/output controller 135. Other I/O devices 140-155 may be included. The computerized unit 101 can further include a display controller 125 coupled to a display 130. In exemplary embodiments, the computerized unit 101 can further include a network interface or transceiver 160 for coupling to a network, to enable, in turn, data communication to/from other, external components.

The network transmits and receives data between the unit 101 and external devices, e.g., physical databases 10, 20 as depicted in FIGS. 1, 2. The network is possibly implemented in a wireless fashion, e.g., using wireless protocols and technologies, such as Wifi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the unit 101 and any external server, client and the like via a broadband connection. In exemplary embodiments, network can be a managed IP network administered by a service provider. Besides, the network can be a packet-switched network such as a LAN, WAN, Internet network, an Internet of things network, etc.

If the unit 101 is a PC, workstation, intelligent device or the like, the software in the memory 110 may further include a basic input output system (BIOS). The BIOS is stored in ROM so that the BIOS can be executed when the computer 101 is activated. When the unit 101 is in operation, the processor(s) 105 is(are) configured to execute software stored within the memory 110, to communicate data to and from the memory 110, and to generally control operations of the computer 101 pursuant to the software.

The methods described herein and the OS 111, in whole or in part are read by the processor(s) 105, typically buffered within the processor(s) 105, and then executed. When the methods described herein are implemented in software, the methods can be stored on any computer readable medium, such as storage 120, for use by or in connection with any computer related system or method.

3. Computer Program Products

According to a final aspect, the invention can be embodied as a computer program product for linking records of a given query entity to records of a master database. The computer program product comprises a computer readable storage medium having program instructions embodied therewith, where the program instructions are executable by one or more processors, to cause to take steps according to the present methods.

The present invention may thus be embodied as a computerized hardware system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method of record linkage, the method comprising:
    accessing a given query entity of a query database and a set of reference entities from a master database, wherein each entity accessed corresponds to an entry in a respective database, which entry is mapped to a set of words decomposed into tokens;
    for each reference entity of said set of reference entities from the master database:
        identifying, for each token of the given query entity, a closest token in said each reference entity according to a string metric, whereby closest tokens identified are respectively associated with highest scores of similarity with the tokens of the query entity, wherein the closest tokens identified in said each reference entity comprise a first type of token and a second type of token, and the highest scores of similarity are weighted differently, depending on whether they are associated to closest tokens of the first type or of the second type to determine weighted highest scores; and
        computing an entity similarity score between said given query entity and said each reference entity, based on said highest scores of similarity, by summing the weighted highest scores of similarity associated with the closest tokens identified in said each reference entity;
    training a machine-learning model for the machine-learning model to learn relative weight to use for weighting said highest scores of similarity, based on successive query entities processed to link records of such query entities to records of the master database;
    identifying a reference entity of the master database that is closest to said given query entity, based on the entity similarity score computed for each of said reference entities; and
    based on the closest reference entity identified, linking records of the given query entity to records of the master database.

2. The method according to claim 1, wherein
identifying said closest tokens comprises:
    computing token similarity scores according to said string metric, whereby the computed scores depend, each, on a distance between a respective token from the given query entity and a token from the master database; and
    identifying, for each token of the given query entity, said closest token in said each reference entity based on the scores computed with respect to tokens of said each reference entity.

3. The method according to claim 1, wherein
the string metric used to identify said closest tokens is a Levenshtein distance metric.

4. The method according to claim 1, wherein
the first type of token is an alphanumeric token, and the second type of token is a non-alphanumeric token.

5. The method according to claim 4, wherein
the entity similarity score LT is computed according to:

$$LT = \frac{\sum_{i=1}^{n} \alpha \cdot s(t_i) \cdot 1(t_i \in \bar{\mathcal{A}}_r) + s(t_i) \cdot 1(t_i \in \mathcal{A})}{\sum_{i=1}^{n} \alpha \cdot 1(t_i \in \bar{\mathcal{A}}_r) + 1(t_i \in \mathcal{A})},$$

where:
    $\alpha$ is a weight assigned to highest scores $s(t_i)$ for non-alphanumeric tokens $t_i \in \bar{\mathcal{A}}$, whereas highest scores $s(t_i)$ of alphanumeric tokens $t_i \in \mathcal{A}$ are assigned a weight equal to 1; and
    $1(t_i \in \mathcal{X})$ is an indicator function, outputting 1, if $t_i \in \mathcal{X}$, and 0 otherwise.

6. The method according to claim 1, wherein
records of the given query entity are linked to records of the master database only if the entity similarity score computed for the reference entity identified as closest to said given query entity is larger than a given threshold $\beta$.

7. The method according to claim 1, wherein
the given query entity accessed corresponds to an entry of the query database, which entry is mapped to a textual description and accessing said given query entity further comprises decomposing the textual description into tokens.

8. The method according to claim 7, wherein
decomposing the textual description into tokens comprises concatenating two or more consecutive words of the textual description to form corresponding tokens.

9. The method according to claim 7, wherein
the consecutive words concatenated include a string of characters, and a string of digits, thereby resulting in alphanumeric tokens.

10. The method according to claim 1, wherein the method further comprises, prior to accessing the given query entity and the reference entities:
decomposing the query database into query entities; and
selecting said given query entity among said query entities.

11. The method according to claim 1, wherein the method further comprises, prior to accessing the given query entity and the reference entities:
grouping similar reference entities of the master database to form said set of reference entities.

12. The method according to claim 11, wherein grouping said similar reference entities comprises:
clustering reference entities of the master database to obtain clusters of similar reference entities; and
selecting reference entities from each of the clusters obtained to form said set of reference entities, whereby said set of reference entities comprises several reference entities, each selected from a respective one of the clusters obtained.

13. The method according to claim 11, wherein grouping said similar reference entities comprises:
identifying, among query entities that have previously been processed similarly as said given query entity, a set of query entities that are most similar to said given query entity; and
identifying reference entities of the master database that have previously been found to be closest to said set of most similar query entities identified, to form said set of reference entities.

14. The method according to claim 1, wherein
each entity accessed corresponds to an entry mapped to a set of words decomposed into tokens, where each of the tokens includes a string that comprises at least one word from said set of words.

15. A computer-implemented method of record linkage, the method comprising:
accessing a given query entity of a query database and a set of reference entities from a master database, wherein each entity accessed corresponds to an entry in a respective database, which entry is mapped to a set of words decomposed into tokens;
for each reference entity of said set of reference entities from the master database:
identifying, for each token of the given query entity, a closest token in said each reference entity according to a string metric, whereby closest tokens identified are respectively associated with highest scores of similarity with the tokens of the query entity; and
computing an entity similarity score between said given query entity and said each reference entity, based on said highest scores of similarity,
identifying a reference entity of the master database that is closest to said given query entity, based on the entity similarity score computed for each of said reference entities;
based on the closest reference entity identified, linking records of the given query entity to records of the master database; and
training a machine-learning model for the machine-learning model to learn a given threshold $\beta$, based on successive query entities processed to link records of such query entities to records of the master database, wherein the records of the given query entity are linked to the records of the master database only if the entity similarity score computed for the reference entity identified as closest to said given query entity is larger than said given threshold $\beta$.

16. A computerized data management system, comprising:
a memory; and
at least one processor, coupled to said memory, and operative to perform operations comprising:
accessing a given query entity of a query database and a set of reference entities from a master database, wherein each entity accessed corresponds to an entry in a respective database, which entry is mapped to a set of words decomposed into tokens;
for each reference entity of said set of reference entities from the master database:
identifying, for each token of the given query entity, a closest token in said each reference entity according to a string metric, whereby closest tokens identified are respectively associated with highest scores of similarity with the tokens of the query entity, wherein the closest tokens identified in said each reference entity comprises a first type of token and a second type of token, and the highest scores of similarity are weighted differently, depending on whether they are associated to closest tokens of the first type or of the second type to determine weighted highest scores; and
computing an entity similarity score between said given query entity and said each reference entity, based on said highest scores of similarity, by summing the weighted highest scores of similarity associated with the closest tokens identified in said each reference entity;
training a machine-learning model for the machine-learning model to learn relative weight to use for weighting said highest scores of similarity, based on successive query entities processed to link records of such query entities to records of the master database;
identifying a reference entity of the master database that is closest to said given query entity, based on the entity similarity score computed for each of said reference entities; and
based on the closest reference entity identified, linking records of the given query entity to records of the master database.

17. A computer program product for linking records of a given query entity to records of a master database, the computer program product comprising a computer readable storage medium having program instructions embodied therewith, the program instructions executable by one or more processors, to cause to:
access a given query entity of a query database and a set of reference entities from a master database, wherein each entity accessed corresponds to an entry in a respective database, which entry is mapped to a set of words decomposed into tokens;
for each reference entity of said set of reference entities from the master database:
identify, for each token of the given query entity, a closest token in said each reference entity according to a string metric, whereby closest tokens identified are respectively associated with highest scores of similarity with the tokens of the query entity, wherein the closest tokens identified in said each reference entity comprises a first type of token and a second type of token, and the highest scores of similarity are weighted differently, depending on whether they are associated to closest tokens of the first type or of the second type to determine weighted highest scores; and compute an entity similarity score between said given query entity and said each reference entity, based on said highest scores of similarity, by summing the weighted highest scores of similarity associated with the closest tokens identified in said each reference entity;

train a machine-learning model for the machine-learning model to learn relative weight to use for weighting said highest scores of similarity, based on successive query entities processed to link records of such query entities to records of the master database;

identify a reference entity of the master database that is closest to said given query entity, based on the entity similarity score computed for each of said reference entities; and based on the closest reference entity identified, link records of the given query entity to records of the master database.

\* \* \* \* \*